United States Patent
Wang

(10) Patent No.: US 9,459,466 B2
(45) Date of Patent: Oct. 4, 2016

(54) EYEWEAR TEMPLE

(71) Applicant: Eye Care Eyewear Inc., Tainan (TW)

(72) Inventor: Chao-Cheng Wang, Tainan (TW)

(73) Assignee: Eye Care Eyewear Inc., Tainan (TW)

( * ) Notice: Subject to any disclaimer, the term of this patent is extended or adjusted under 35 U.S.C. 154(b) by 83 days.

(21) Appl. No.: 14/501,353

(22) Filed: Sep. 30, 2014

(65) Prior Publication Data

US 2016/0091732 A1  Mar. 31, 2016

(51) Int. Cl.
   *G02C 5/16* (2006.01)
   *G02C 5/22* (2006.01)
   *G02C 5/14* (2006.01)

(52) U.S. Cl.
   CPC .............. *G02C 5/16* (2013.01); *G02C 5/146* (2013.01); *G02C 5/2218* (2013.01); *G02C 5/2236* (2013.01)

(58) Field of Classification Search
   CPC ....... G02C 5/16; G02C 5/146; G02C 5/2218
   USPC ........ 351/113, 114, 117, 112, 153, 121, 119; 16/228
   See application file for complete search history.

(56) References Cited

U.S. PATENT DOCUMENTS

| | | | | |
|---|---|---|---|---|
| 4,494,834 A * | 1/1985 | Tabacchi | ............. | G02C 5/2245 16/228 |
| 5,018,242 A * | 5/1991 | Guy | ..................... | G02C 5/2236 16/228 |
| 5,739,891 A * | 4/1998 | Wei | ...................... | G02C 5/2209 16/228 |
| 5,889,575 A * | 3/1999 | Wang | .................. | G02C 5/2236 16/228 |
| 8,684,518 B2 * | 4/2014 | Gasparetto | ............... | G02C 5/22 16/228 |
| 2007/0166122 A1 * | 7/2007 | McDuff | ............. | F16B 13/0808 411/31 |
| 2010/0239943 A1 * | 9/2010 | Kobayashi | ........ | H01M 8/04186 429/479 |

* cited by examiner

*Primary Examiner* — Bumsuk Won
*Assistant Examiner* — Grant Gagnon
(74) *Attorney, Agent, or Firm* — C. G. Mersereau; Nikolai & Mersereau, P.A.

(57) ABSTRACT

The eyewear temple has a temple body and a resilient assembly. The resilient assembly is mounted in the chamber of the temple body and has a guide member and a connecting rod. The guide member has a recess, a shaft hole, an opening and a through hole. The recess is axially formed in the guide member. The shaft hole is radially formed through the guide member. The opening is formed on a front surface of the guide member. The through hole is formed in a rear surface of the guide member. The connecting rod is easy to be directly inserted through the opening and the recess of the guide member, and is connected to the temple body. Therefore, the resilient assembly is easy to be assembled on the temple body, and the combination strength between the temple body and the connecting rod is easy to be adjusted.

5 Claims, 8 Drawing Sheets

EYEWEAR TEMPLE

BACKGROUND OF THE INVENTION

1. Field of the Invention

The present invention relates to an eyewear temple, and more particularly to an eyewear temple that is pivotable relative to a frame.

2. Description of Related Art

With reference to FIGS. 5 and 6, a conventional eyewear temple has a body 80 and a resilient assembly 81. The body 80 has a chamber 82 and a first hole 83. The chamber 82 is formed in the body 80. The first hole 83 is formed in an outer surface of the body 80. The resilient assembly 81 is mounted in the chamber 82 of the body 80. The resilient assembly 81 has a seat 84, a retaining element 88, a guide member 85, a connecting rod 86 and a spring 87. The seat 84 is mounted in the chamber 82 of the body 80 and has a second hole 841 communicating with the first hole 83 of the body 80. The retaining element 88 is inserted through the first hole 83 of the body 80 and the second hole 841 of the seat 84 to combine the body 80 and the seat 84. The guide member 85 is inserted in the seat 84 and has a shaft hole 851 exposed out of the body 80 and the seat 84. The connecting rod 86 is mounted in the chamber 82 of the body 80. An end of the connecting rod 86 is inserted through the seat 84 and is screwed into the guide member 85. The spring 87 is mounted around the connecting rod 86. Two ends of the spring 87 are connected to the connecting rod 86 and the seat 84 respectively.

The eyewear temple is pivotably connected to a frame by the shaft hole 851 of the guide member 85. When a pulling force is applied to the body 80 and the seat 84 to expand the eyewear temple out, the spring 87 is pressed and the connecting rod 86 is forced. A conjunction between the connecting rod 86 and the guide member 85 is adjacent to the shaft hole 851 of the guide member 85, so the connecting rod 86 and the guide member 85 are applied with a large force that may damage the conjunction between the connecting rod 86 and the guide member 85.

To improve the drawback of the conventional eyewear temple, another conventional eyewear temple is provided. With reference to FIGS. 7 and 8, the eyewear temple has a body 90 and a resilient assembly 91. The body 90 has a chamber 92 and a retaining hole 93. The chamber 92 is formed in the body 90. The retaining hole 93 is formed in the body 90 and is in communication with the chamber 92. The resilient assembly 91 is mounted in the chamber 92 of the body 90. The resilient assembly 91 has a guide member 94, a connecting rod 95 and a spring 96. The guide member 94 is mounted in the chamber 92 of the body 90. The guide member 94 has a first end, a second end, a recess 941, a side opening, a shaft hole 942 and a through hole 943. The second end of the guide member 94 is inserted in the chamber 92 of the body 90. The recess 941 is formed in the guide member 94. The side opening is formed in a side surface of the guide member 94 and is in communication with the recess 941. The shaft hole 942 is formed in the first end of the guide member 94 and is exposed out of the body 90. The through hole 943 is formed in the second end of the guide member 94 and is in communication with the recess 941. The connecting rod 95 is inserted through the side opening of the guide member 94 and is further inserted into and held in the recess 941 of the guide member 94. The connecting rod 95 has a retaining part 951 formed on an end of the connecting rod 95. The retaining part 951 is inserted through the through hole 943 of the guide member 94 and is inserted into the retaining hole 93 of the body 90. The spring 96 is mounted around the connecting rod 95. Two ends of the spring 96 are connected to the connecting rod 95 and the guide member 94 respectively.

The eyewear temple is pivotably connected to a frame via the shaft hole 942 of the guide member 94. A pulling force is applied to the eyewear temple, and the body 90 is pulled out and the connecting rod 95 is pulled to compress the spring 96. A conjunction between the body 90 and the connecting rod 95 is distal from the shaft hole 942, and the connecting rod 95 is not screwed with the guide member 94 so that damage to the guide member 94 and the connecting rod 95 can be reduced.

To combine the guide member 94 and the body 90 by the connecting rod 95, the connecting rod 95 has to be inserted through the side opening of the guide member 94 and is further inserted and held in the recess 941 of the guide member 94, and the retaining part 951 of the connecting rod 95 is inserted through the through hole 943 and is inserted in the retaining hole 93 of the body 90. Thus, to combine the guide member 94 and the body 90 by the connecting rod 95 is difficult. Therefore, the conventional eyewear temple is inconvenient in assembly, and the combination strength between the body 90 and the connecting rod 95 is difficult to adjust.

To overcome the shortcomings, the present invention tends to provide an eyewear temple to mitigate or obviate the aforementioned problems.

SUMMARY OF THE INVENTION

The main objective of the invention is to provide an eyewear temple that is easy to assemble.

The eyewear temple has a temple body and a resilient assembly. The temple body has an end surface, a chamber and a retaining hole. The chamber is formed in the end surface of the temple body. The retaining hole is formed in the temple body and is in communication with the chamber of the temple body. The resilient assembly is mounted in the chamber of the temple body and has a guide member, a connecting rod and a spring. The guide member is inserted into the chamber of the temple body. The guide member has a front surface, a rear surface, a recess, a shaft hole, an opening, a through hole and a connecting surface. The front surface protrudes out of the end surface of the temple body. The rear surface is opposite to the front surface and faces the retaining hole of the temple body. The recess is axially formed in the guide member. The shaft hole is radially formed through the guide member. The opening is formed in the front surface and is in communication with the recess. The through hole is formed in the rear surface and is in communication with the recess. The connecting surface is formed in the guide member and around the through hole of the guide member. The connecting rod is inserted through the opening and the recess of the guide member, is connected to the temple body, and has a head and a rod body. The rod body is formed on the head and has a retaining part. The retaining part is formed on an end of the rod body, is inserted through the through hole of the guide member, and is inserted into the retaining hole of the temple body. The spring is mounted around the connecting rod, and two ends of the spring are respectively connected to the head of the connecting rod and the connecting surface of the guide member.

The spring is mounted around the connecting rod, and then the connecting rod is axially inserted through the opening, the recess, and the through hole of the guide member. The guide member is inserted in the chamber of the temple body, and then the retaining part of the connecting rod is further inserted into the retaining hole of the temple body. Therefore, the resilient assembly is easy to be assembled on the temple body. Moreover, the connecting rod can be conveniently and directly controlled, such that the combination strength between the temple body and the connecting rod is easy to be adjusted.

Other objects, advantages and novel features of the invention will become more apparent from the following detailed description when taken in conjunction with the accompanying drawings.

DETAILED DESCRIPTION OF PREFERRED EMBODIMENT

Figure 1:
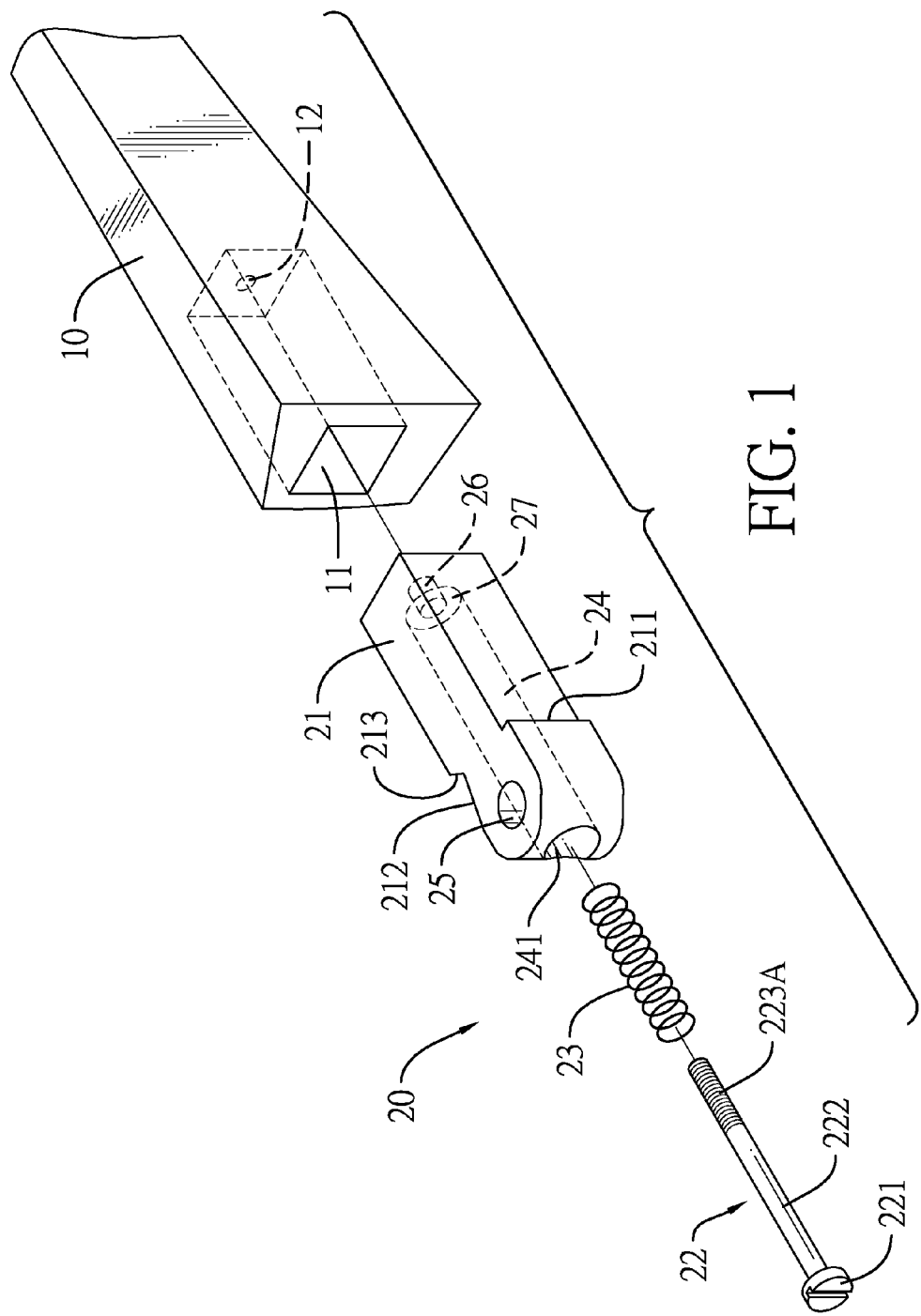
FIG. 1 is an exploded perspective view of an eyewear temple in accordance with the present invention.
Figure 2:
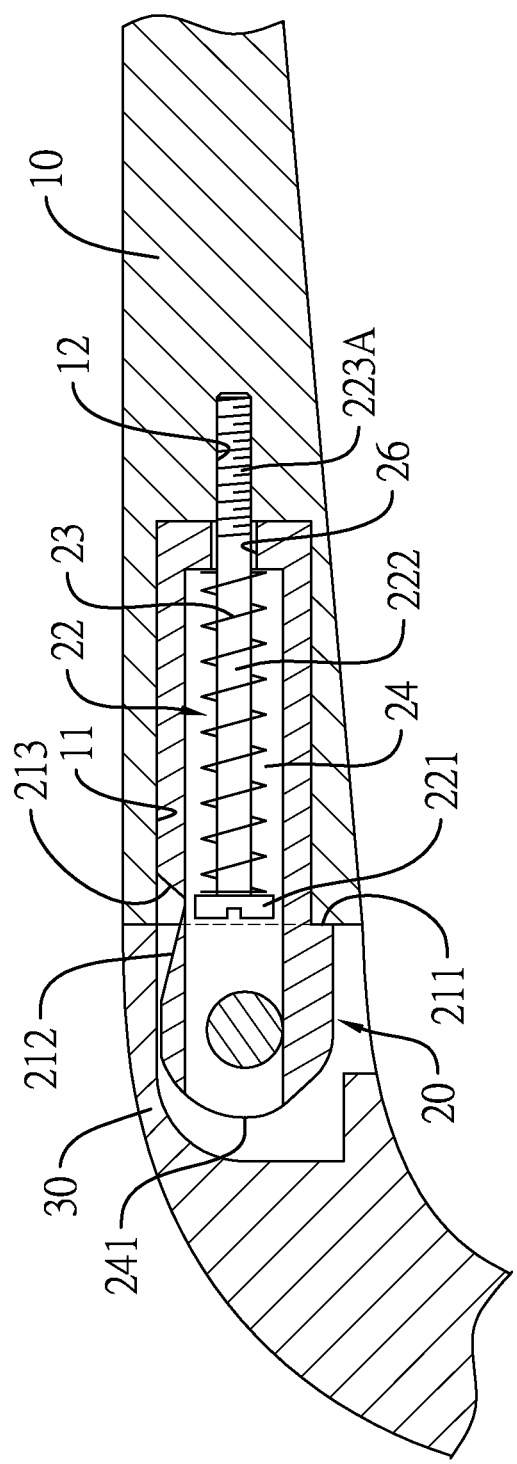
FIG. 2 is an operational top view in partial section of the eyewear temple in FIG. 1 combined with a frame.
Figure 4:
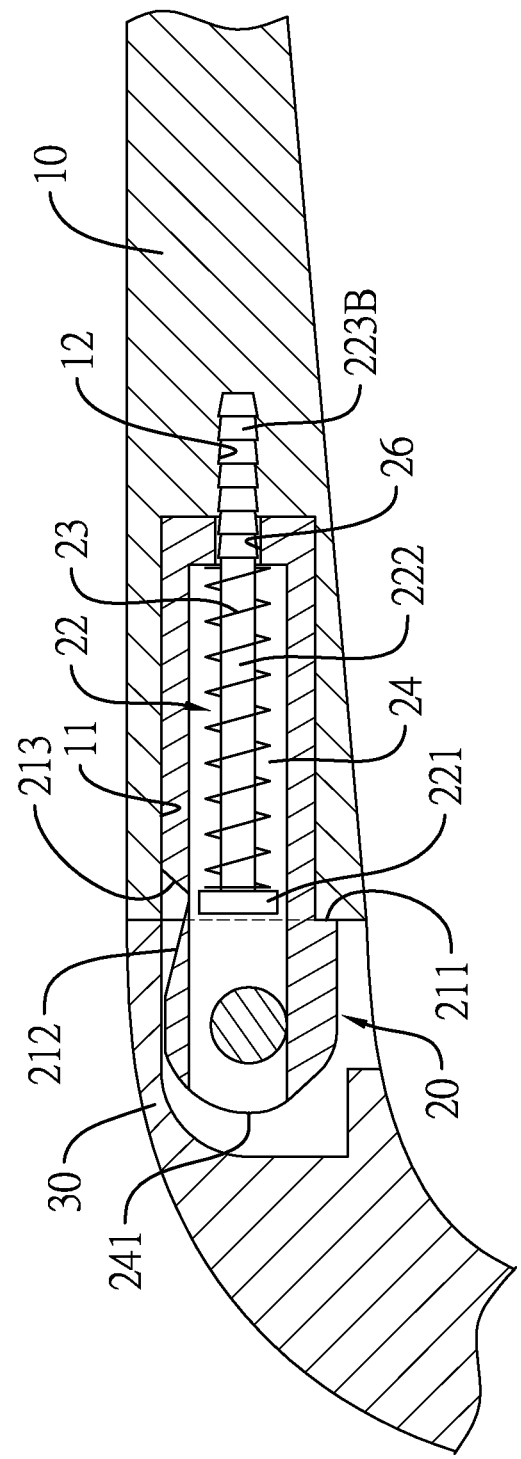
FIG. 4 is another operational top view in partial section of the eyewear temple in FIG. 1 combined with a frame.
Figure 5:
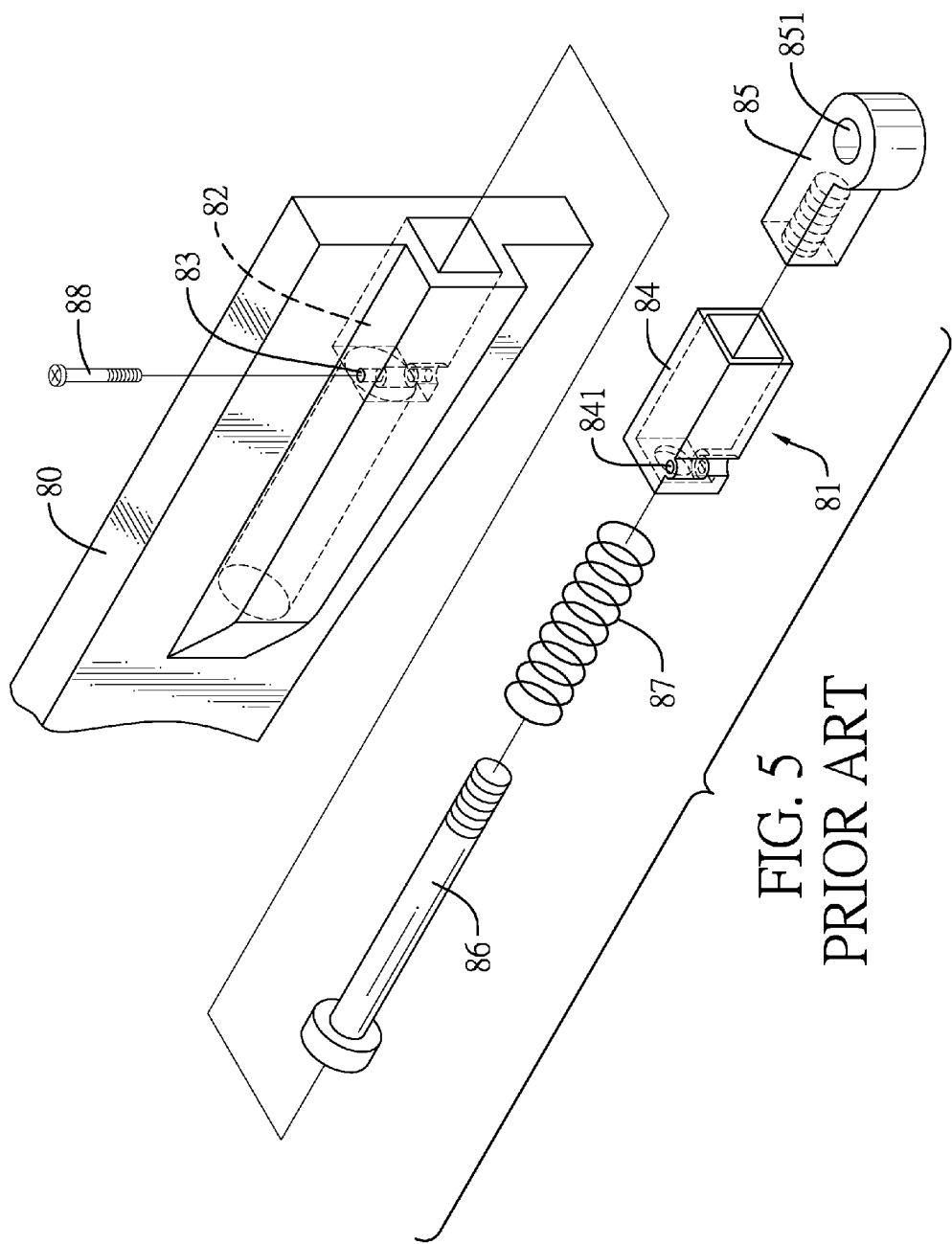
FIG. 5 is an exploded perspective view of a conventional eyewear temple in accordance with the prior art.
Figure 6:
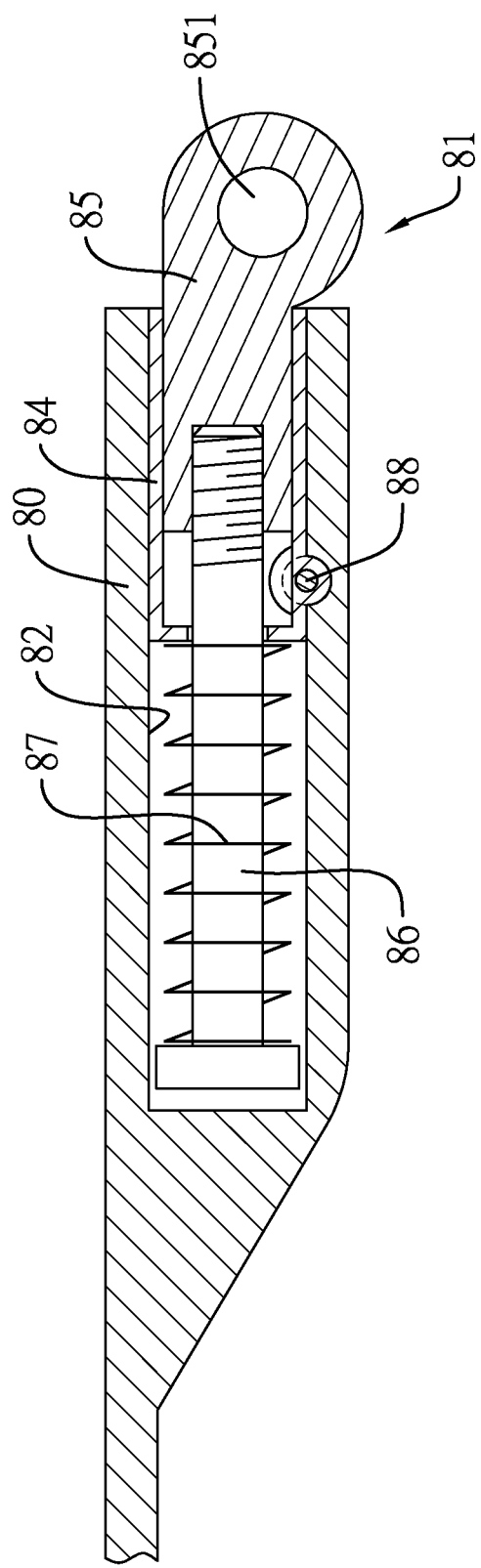
FIG. 6 is an operational top view in partial section of the conventional eyewear temple in FIG. 5 combined with a frame.
Figure 7:
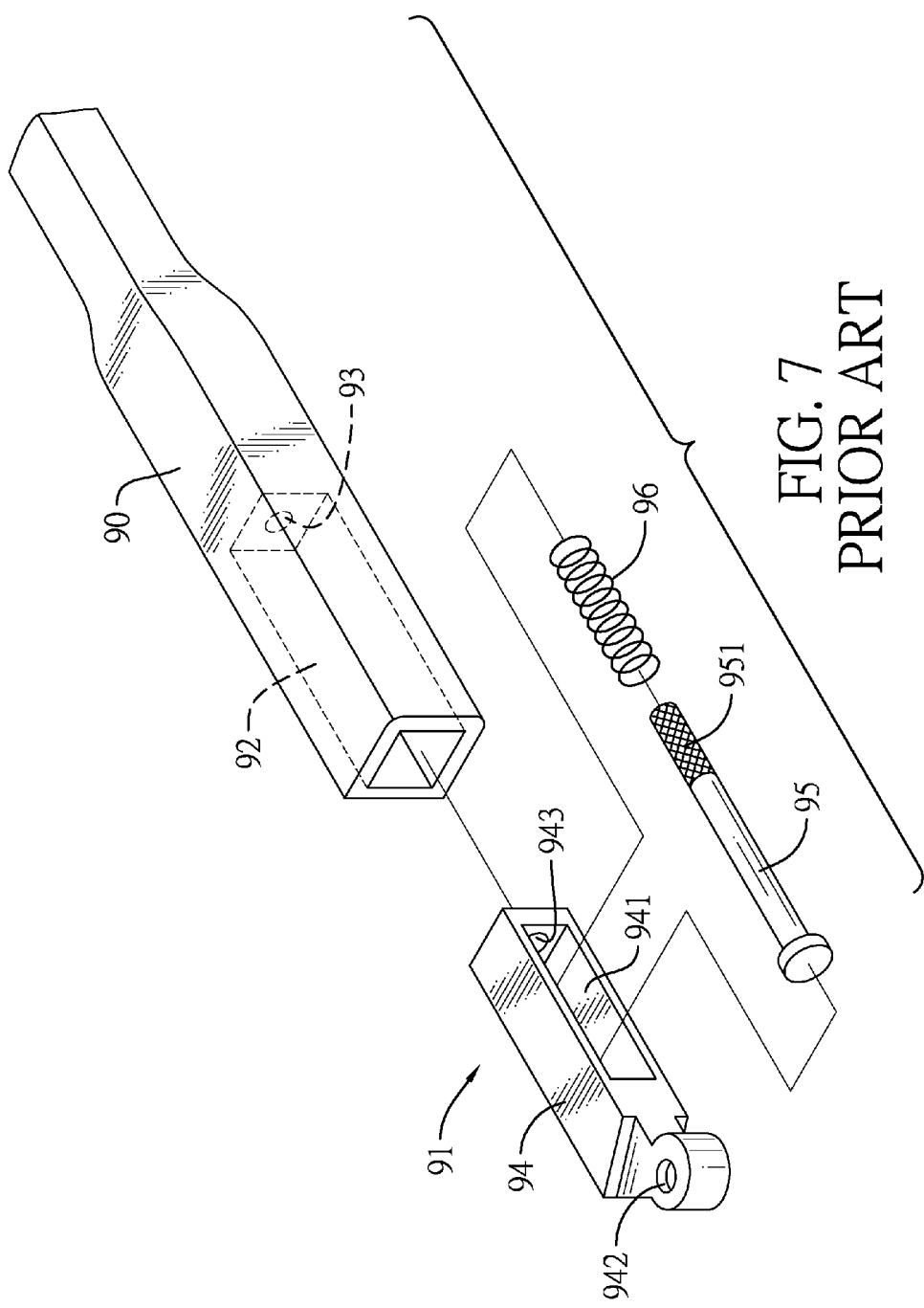
FIG. 7 is an exploded perspective view of another conventional eyewear temple in accordance with the prior art.
Figure 8:
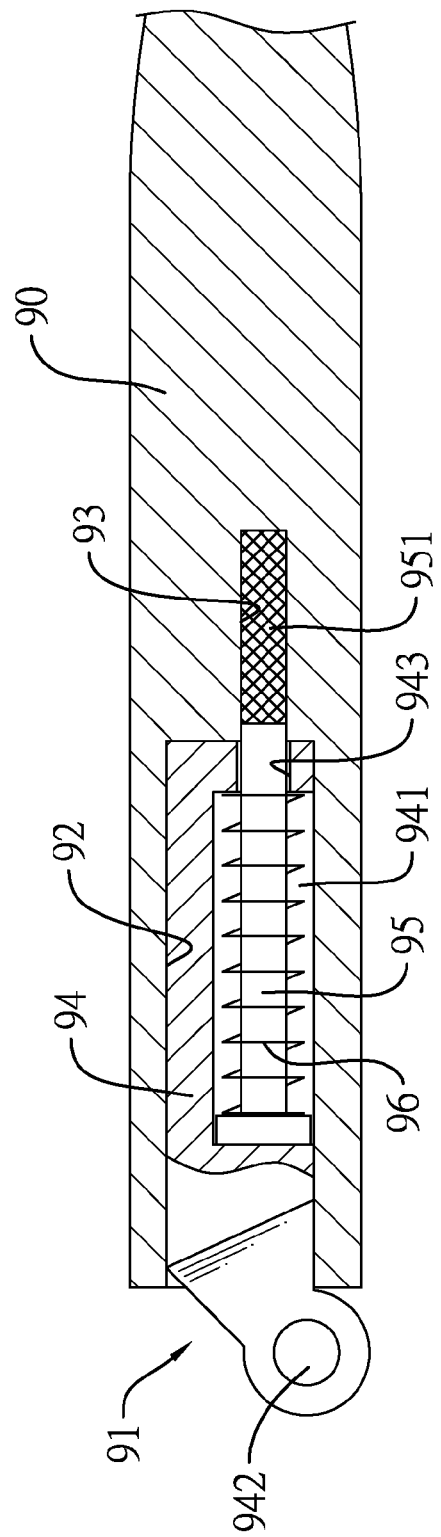
FIG. 8 is an operational top view in partial section of the eyewear temple in FIG. 7 combined with a frame.

With reference to FIGS. 1, 2 and 4, an eyewear temple in accordance with the present invention comprises a temple body 10 and a resilient assembly 20.

The temple body 10 has an end surface, a chamber 11 and a retaining hole 12. The chamber 11 is formed in the end surface of the temple body 10. The retaining hole 12 is formed in the temple body 10 and is in communication with the chamber 11 of the temple body 10.

The resilient assembly 20 is mounted in the chamber 11 of the temple body 10. The resilient assembly 20 has a guide member 21, a connecting rod 22 and a spring 23. The guide member 21 has a front surface, a rear surface, a recess 24, a shaft hole 25, an opening 241, a through hole 26 and a connecting surface 27. The front surface of the guide member 21 protrudes out of the end surface of the temple body 10. The rear surface is opposite to the front surface and faces the retaining hole 12 of the temple body 10. The recess 24 is axially formed in the guide member 21. The shaft hole 25 is radially formed through the guide member 21. The opening 241 is formed in the front surface and is in communication with the recess 24. The through hole 26 is formed in the rear surface and is in communication with the recess 24. The connecting surface 27 is formed in the guide member 21 and around the through hole 26 of the guide member 21. The connecting rod 22 is inserted through the opening 241 and the recess 24 of the guide member 21, and is connected to the temple body 10. The connecting rod 22 has a head 221 and a rod body 222. The rod body 222 is formed on the head 221 and has a retaining part 223A, 223B. The retaining part 223A, 223B is formed on an end of the rod body 222, is inserted through the through hole 26 of the guide member 21, and is inserted into the retaining hole 12 of the temple body 10. The spring 23 is mounted around the connecting rod 22, and two ends of the spring 23 are respectively connected to the head 221 of the connecting rod 22 and the connecting surface 27 of the guide member 21.

The guide member 21 further has a first surface, a second surface, a first limiting surface 211, a second limiting surface 212, and a third limiting surface 213. The second surface is opposite to the first surface. The first limiting surface 211 is formed on the first surface of the guide member 21 and faces the end surface of the temple body 10. The second limiting surface 212 is inclined relative to the second surface of the guide member 21 and is formed on the second surface of the guide member 21. The third limiting surface 213 is inclined relative to the second surface of the guide member 21, is formed on the second surface of the guide member 21, and is connected to the second limiting surface 212.

The retaining part 223A, 223B of the connecting rod 22 is a concave-convex structure. With reference to FIG. 2, the retaining part 223A of the connecting rod 22 is a thread, and the retaining hole 12 of the temple body 10 is a threaded hole. With reference to FIG. 4, the retaining part 223B of the connecting rod 22 has multiple pyramidal portions.

The guide member 21 is mounted in the chamber 11 of the temple body 10. The shaft hole 25, the opening 241 and the second limiting surface 212 of the guide member 21 are located out of the temple body 10, and the third limiting surface 213 of the guide member 21 is located in the chamber 11 of the temple body 10, and the first limiting surface 211 of the guide member 21 is connected to the end surface of the temple body 10. Then, the spring 23 is mounted around the rod body 222 of the connecting rod 22. The connecting rod 22 and the spring 23 are inserted through the opening 241 of the guide member 21, and then the spring 23 is located in the recess 24 of the guide member 21. The retaining part 223A, 223B of the connecting rod 22 is further inserted through the through hole 26 and is inserted in the retaining hole 12 of the temple body 10. The head 221 of the connecting rod 22 is rotated by a tool and then the retaining part 223A is screwed into the retaining hole 12 of the temple body 10. Or the head 221 of the connecting rod 22 is pushed by a tool, and the retaining part 223B is forced into the retaining hole 12 of the temple body 10. Therefore, combination strength between the temple body 10 and the connecting rod 22 is easy to adjust.

Figure 3:
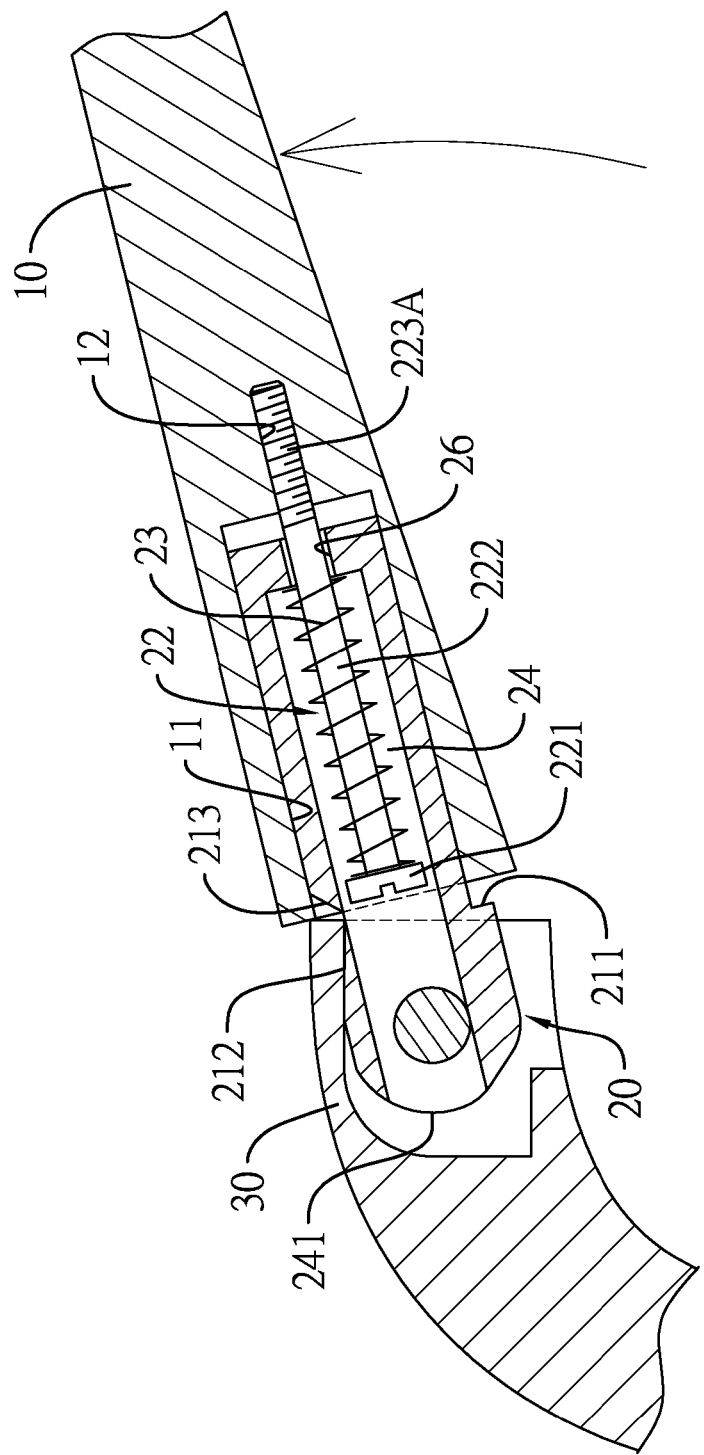
FIG. 3 is an operational top view in partial section of the eyewear temple in FIG. 1 showing a temple body pivoted.

With reference to FIG. 2, the eyewear temple is pivotably connected to a frame 30 by the shaft hole 25 of the guide member 21, and the second limiting surface 212 of the guide member 21 is inserted in the frame 30. With reference to FIG. 3, the temple body 10 is pushed and expanded out, and the spring 23 is pressed. The guide member 21 is pivoted, and the second limiting surface 212 of the guide member 21 is further connected to the frame 30 to enlarge a pivoting angle of the temple body 10 and position the temple body 10.

Accordingly, the connecting rod 22 is axially inserted through the opening 241, the recess 24 and the through hole 26 of the guide member 21, and the retaining part 223A, 223B of the connecting rod 22 is connected to the temple body 10. Therefore, the resilient assembly 20 is easily assembled on the temple body 10, and the combination strength between the temple body and the connecting rod is easy to be adjusted, and damage to the connecting rod 22 and the temple body 10 can be reduced.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An eyewear temple comprising:
   a temple body having
      an end surface;
      a chamber formed in the end surface of the temple body; and
      a retaining hole formed in the temple body and communicating with the chamber of the temple body; and
   a resilient assembly mounted in the chamber of the temple body and having a guide member inserted into the chamber of the temple body and having a front surface protruding out of the end surface of the temple body;
      a rear surface being opposite to the front surface and facing the retaining hole of the temple body;
      a recess axially formed in the guide member;
      a shaft hole radially formed through the guide member;
      an opening formed in the front surface and communicating with the recess;
      a through hole formed in the rear surface and communicating with the recess;
      a connecting surface formed in the guide member and around the through hole of the guide member;
      a first surface;
      a second surface being opposite to the first surface of the guide member;
      a first limiting surface formed on the first surface of the guide member and facing the end surface of the temple body; and
      a second limiting surface being inclined relative to the second surface of the guide member and formed on the second surface of the guide member;
   a connecting rod inserted through the opening and the recess of the guide member, the connecting rod connected to the temple body and having
      a head; and
      a rod body formed on the head and having
         a retaining part formed on an end of the rod body, inserted through the through hole of the guide member, and inserted into the retaining hole of the temple body; and
   a spring mounted around the connecting rod, and two ends of the spring respectively connected to the head of the connecting rod and the connecting surface of the guide member.

2. The eyewear temple as claimed in claim 1, wherein the guide member has
   a third limiting surface being inclined relative to the second surface of the guide member, the third limiting surface formed on the second surface of the guide member and connected to the second limiting surface.

3. The eyewear temple as claimed in claim 1, wherein the retaining part of the connecting rod is a concave-convex structure.

4. The eyewear temple as claimed in claim 3, wherein the retaining part of the connecting rod is a thread, and the retaining hole of the temple body is a threaded hole.

5. The eyewear temple as claimed in claim 3, wherein the retaining part of the connecting rod has multiple pyramidal portions.

* * * * *